June 20, 1939.　　　　B. DICK　　　　2,162,775
BRAKE ACTUATING MECHANISM
Filed Jan. 23, 1937　　　2 Sheets-Sheet 2
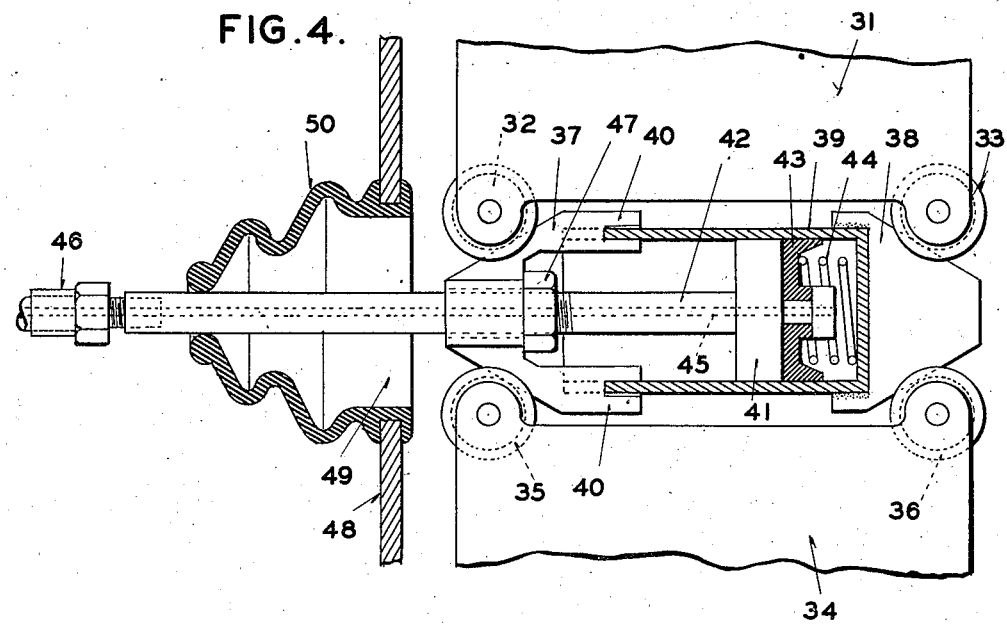
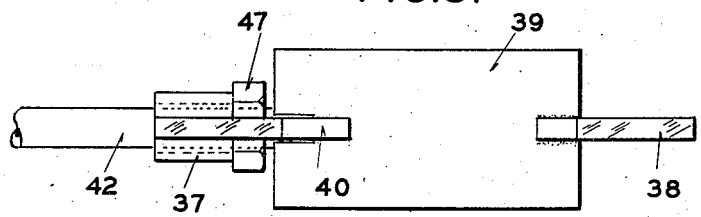
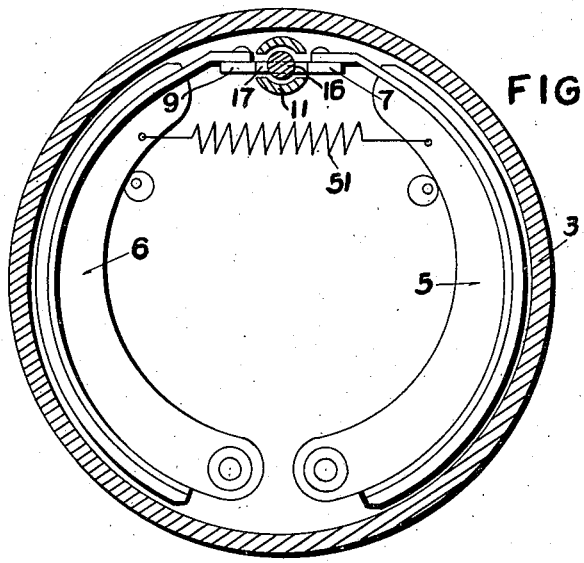
INVENTOR
BURNS DICK
ATTORNEY Patented June 20, 1939

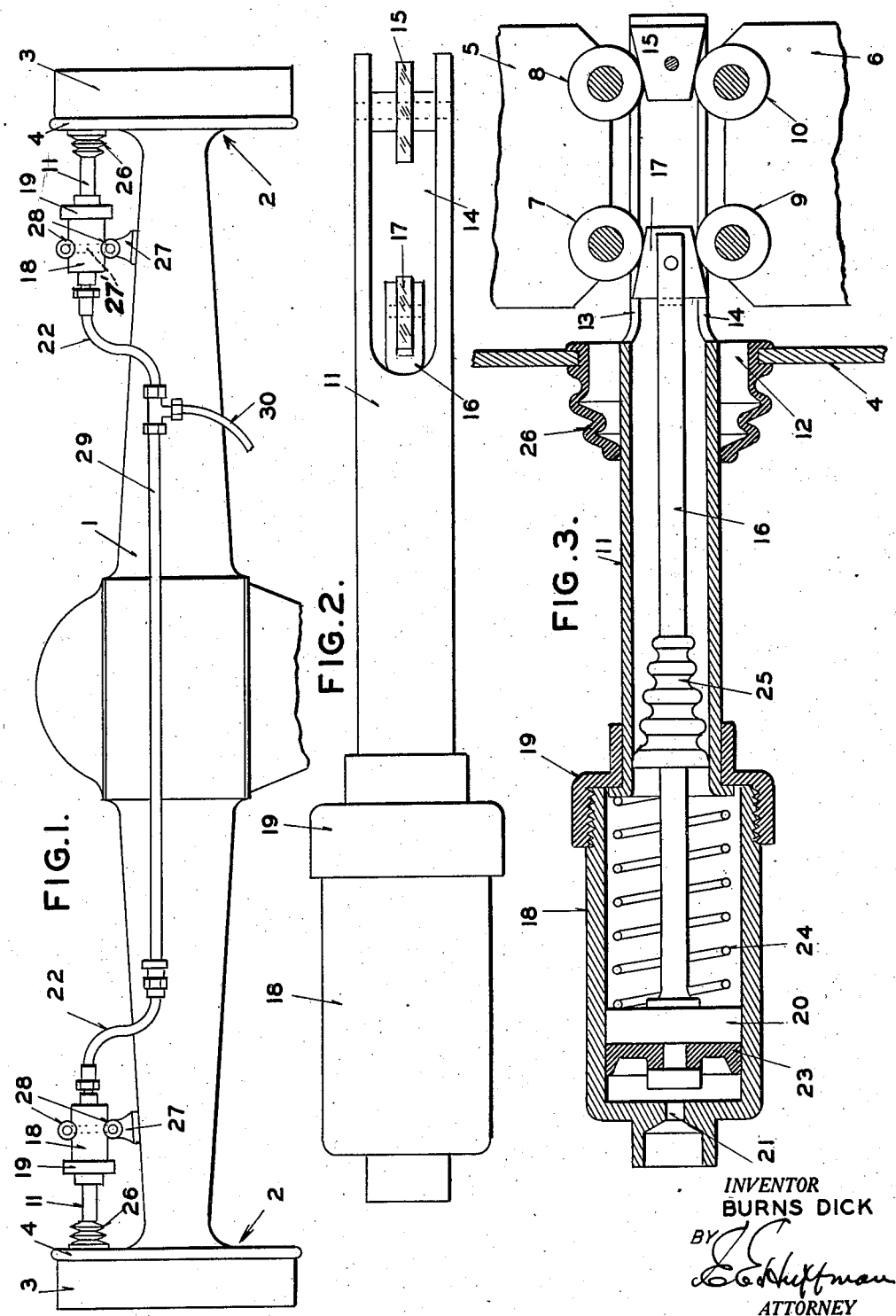

2,162,775

UNITED STATES PATENT OFFICE 2,162,775

BRAKE ACTUATING MECHANISM

Burns Dick, Ferguson, Mo., assignor to Wagner Electric Corporation, St. Louis, Mo., a corporation of Delaware Application January 23, 1937, Serial No. 122,055

11 Claims. (Cl. 188—152)

My invention relates to brakes and more particularly to mechanism for moving the friction element thereof into cooperative engagement with the rotatable element.

One of the objects of my invention is to construct a brake actuating mechanism that is particularly adapted to be associated with a brake having a relatively wide brake shoe or brake band.

Another object of my invention is to provide a pair of wedge or cam means which may be simultaneously operated with equal force to actuate a brake.

Still a further and more specific object of my invention is to provide two wedge elements for expanding the adjacent ends of either a pair of brake shoes or a brake band and an associated floating fluid motor for moving said wedges in opposite directions and with equal force.

Still another object of my invention is to produce an efficient, compact, and economical actuating mechanism of the fluid pressure type.

Other objects of my invention will become apparent from the following description taken in connection with the accompanying drawings showing several embodiments thereof.

In the drawings Figure 1 is a view of a vehicle axle showing my brake actuating mechanism associated with the brake assemblies at each end; Figure 1A is a side view of a brake assembly; Figure 2 is an elevation of one of the actuating fluid motors and associated wedges; Figure 3 is a cross-sectional view of the structure of Figure 2 showing it in operative position with respect to the friction device or brake shoes; Figure 4 is a cross-sectional view of a modified construction showing it associated with the brake shoes; and Figure 5 is an elevation of the modified construction.

Referring to Figures 1, 2, and 3, I have shown my novel brake actuating mechanism associated with the rear axle of a motor vehicle in which a brake assembly is employed at each end thereof in association with the usual wheels but it is to be understood that this is by way of example only as the mechanism may be employed whenever it is desired to actuate the friction device of any brake assembly. Reference character 1 indicates the rear axle housing of the vehicle, and positioned at each end thereof is a brake assembly 2 comprising a brake drum 3, a backing plate 4, and a pair of brake shoes 5 and 6 for cooperation with the drum in a well known manner. The drum 3 is adapted to be attached to a vehicle wheel (not shown) for rotation therewith and backing plate 2, which encloses the open side of the drum, is rigidly secured to the axle housing.

My novel brake actuating mechanism is associated with each brake assembly and since these are duplicates, only one will be described in detail. The end of brake shoe 5 has pivotally mounted thereon spaced rollers 7 and 8 and the adjacent end of brake shoe 6 has pivotally mounted thereon similar spaced rollers 9 and 10, rollers 7 and 9 being opposed to each other and rollers 8 and 10 being opposed to each other in the manner shown.

A tubular member 11 extends through an enlarged opening 12 in backing plate 4 and has its inner end positioned between the adjacent ends of the brake shoes. The opposite sides of the inner end of this tubular member is provided with slots 13 and 14, slot 13 having a portion of rollers 7 and 8 received therein, and slot 14 having a portion of rollers 9 and 10 received therein. The extreme inner end of the tubular member has pivotally mounted thereon a wedge 15 for cooperation with the opposed rollers 8 and 10 on the shoes 5 and 6. A rod 16 is centrally positioned within tubular member 11 and the inner end of this rod has pivotally mounted thereon a wedge 17 for cooperation with the opposed rollers 7 and 9 on shoes 5 and 6. The wedges 15 and 17 are so positioned with respect to their cooperating rollers and to each other that when they are moved toward each other, they will move shoes 5 and 6 in opposite directions and engage these shoes with the inner surface of the brake drum.

The structure employed for moving wedges 15 and 17 toward each other comprises a fluid motor of the cylinder and piston type which is operable by a suitable fluid under pressure. The specific construction shown involves a cylinder 18 connected to the outer end of the tubular member by means of a threaded attaching element 19, and positioned for reciprocation in this cylinder is a piston 20 mounted upon the end of rod 16 which is of such length as to project within the cylinder. The extreme outer end of cylinder 18 is closed with the exception of a passageway 21 for placing the cylinder in communication with a fluid supply conduit 22. The piston 20 has associated therewith a suitable packing element 23 for preventing leakage of fluid past the piston and a spring 24 for returning the piston to its normal position when the fluid pressure is released from the working chamber of the cylinder and piston combination. The rod 16 and tubular member 11 also have associated therewith a suitable flexible boot 25, one end of which is secured to tubular member 11 and the other end to rod 16 in order that dust and dirt may be excluded from the interior of the cylinder. There is also a flexible boot 26 interposed between the tubular element and the backing plate in order that dust and dirt may be prevented from entering the brake assembly through the enlarged opening 12 in the backing plate.

The cylinder and piston combination is suspended for free movement by a support 27 mounted upon axle housing 1. This support carries rollers or spools 28 forming a rolling support for the cylinder, the upper roller or spool being mounted in spaced relation to the lower roller or spool by an upstanding bracket 27 (shown in dashed lines). The conduits 22 leading from each of the cylinders of the fluid motors are interconnected by a suitable conduit 29 and this conduit, in turn, is connected to another conduit 30 leading from the source of pressure which may be either compressed air or a hydraulic compressor depending upon the type of fluid employed.

Referring to the operation of my improved brake actuating mechanism, when it is desired to apply the brakes, fluid under pressure is admitted to the working chamber of the cylinder and piston combination and, as a result thereof, cylinder 18 will be moved to the left carrying with it tubular member 11 and wedge 15, and piston 20 will be moved to the right carrying with it rod 16 and wedge 17. This action results in wedges 15 and 17 being moved toward each other with an equal pressure due to the cylinder and piston being floatingly mounted on support 27 and this movement of the wedges will move brake shoes 5 and 6 outwardly and place them in engagement with the drum, thus bringing about the desired braking action. The brake shoes 5 and 6 are free to move as a unit in order to properly set themselves on the drum, this movement being permitted by the enlarged opening 12 in the backing plate which allows free lateral movement of tubular member 11. When the fluid pressure is released in the cylinder, the retractile spring 51 of the brake shoes will return the wedges, the cylinder, and the piston to their normally inoperative positions.

Referring to Figures 4 and 5, I have shown the actuating cylinder and piston combination mounted within the drum and between the two operating wedges. In this construction the end of brake shoe 31 has pivotally mounted thereon grooved rollers 32 and 33, and the end of brake shoe 34 has pivotally mounted thereon grooved rollers 35 and 36. An operating wedge 37 is adapted to cooperate with rollers 32 and 35, and an operating wedge 38 is adapted to cooperate with rollers 33 and 36, both wedges being positioned in the grooves of the rollers whereby the entire mechanism may be properly supported. The wedge 38 has welded thereto the closed end of cylinder 39, the open end thereof being interengaged for sliding movement with suitable slotted projections 40 on wedge 37. A piston 41 is slidably mounted on the cylinder and secured thereto is a piston rod 42 which extends through a suitable opening in an enlarged portion of wedge 37 and to a point exterior of the brake assembly. This piston has associated therewith a packing 43 for preventing leakage and a spring 44 for maintaining the piston and cylinder in their normal positions. The piston rod 42 is formed with a passageway 45 for placing the working end of the cylinder in communication with the supply conduit 46 attached to the outer end of the piston rod. The piston rod also is provided with a suitable abutment 47, shown as an adjustable nut, cooperating with wedge 37 in order that the movement of the piston may be transferred to this wedge. The backing plate 48 of the brake assembly has an enlarged opening 49 through which piston rod 42 extends and this opening is closed by a suitable flexible boot 50.

In the operation of this modified construction, when it is desired to move the brake shoes into engagement with the drum, fluid under pressure is forced into the working end of the cylinder and piston combination and, as a result thereof, cylinder 39 will be moved to the right carrying with it wedge 38, and piston 41 will be moved to the left carrying with it, by means of abutment 47, wedge 37. The movement of wedges 37 and 38 in opposite directions results in the brake shoes being moved apart, thus applying the brakes. Due to the floating action of the cylinder and piston combination, the pressure exerted upon the shoes by each of the wedges is equal and, therefore, each wedge will tend to expand the portions of the brake shoes it acts upon with an equal force. The interengaging relation between wedge 37 and the cylinder permits free movement of these two members and maintains them in alignment. When the pressure is released in the working chamber, the retractile spring of the brake shoes (not shown) will return the wedges, the cylinder, and the piston to their normally inoperative positions.

Both brake actuating mechanisms just described have been found to be particularly well adapted for solving the problems present in properly actuating small diameter brakes for heavy vehicles wherein relatively wide brake shoes are employed. The wedges apply equal pressure to each side of each shoe and because of this, there is no tendency of the edges of the shoes being bent away from the drum as would be the case in the usual construction wherein a single cylinder and piston combination is employed which is positioned in the same plane as the brake shoes and applies pressure to the centers of the ends of the shoes. Also by using two wedges and a floating cylinder and piston combination the entire construction is in balance and there is no necessity for the provision of a fixed support to take any reaction as the reaction of one wedge is immediately transferred to the other. Because of the floating suspension of the wedges and the fluid motor, the shoes are able to accommodate themselves very readily to the varying contours of the brake drum and the bellmouthing of the drum due to the heat generated during braking. The positioning of the actuating mechanism between the ends of the shoes also eliminates the problem of providing sufficient room to mount the actuating mechanism in the drum below the shoe ends which is present when small diameter brakes are employed. It is also to be noted that the construction shown in Figures 1, 2 and 3 is such as to place the cylinder and piston combination exterior of the drum, thereby permitting a better cooling action and less possibility of the heat generated during braking affecting the fluid actuating mechanism and the liquid therein in the event a liquid is employed.

Being aware of the possibility of modifications in the particular structure herein described without departing from the fundamental principles of my invention, I do not intend that its scope be limited except as set forth by the appended claims.

Having fully described my invention, what I claim as new and desire to secure by Letters Patent of the United States is:

1. In braking apparatus, a rotatable drum, a friction device having a free end and adapted to be moved into engagement with a single zone of the drum, two wedges having opposed inclined surfaces for cooperation with spaced portions of said free end of the friction device to thereby actuate the friction device into engagement with the drum and permit its disengagement to produce a controlled braking action, and fluid-operated means for simultaneously moving said wedges in opposite directions with equal forces and in a plane transverse to the plane of the friction device, the forces produced by said wedges and which act on the end of the friction device in the axial direction of said friction device being balanced.

2. In braking apparatus, a rotatable drum, a friction device adapted to cooperate with a single zone of the drum, two opposed wedges cooperating with different portions of the friction device to control the braking action thereof with the drum, and means for simultaneously moving said wedges in opposite directions in a plane transverse to the plane of the friction device to thereby move said friction device into engagement with the drum, the forces produced by said wedges and which act on the portions of the friction device in the axial direction of said friction device being balanced.

3. In braking apparatus, a rotatable drum, a friction device adapted to cooperate with a single zone of the drum, two opposed wedges cooperating with different portions of the friction device, and means comprising a fluid motor for simultaneously moving said wedges with equal forces and in opposite directions in a plane transverse to the plane of the friction device to thereby move said friction device into engagement with the drum, the forces produced by said wedges and which act on the portions of the friction device in the axial direction of said friction device being balanced.

4. In braking apparatus, a rotatable drum, a friction device adapted to cooperate with a single zone of the drum and having adjacent ends, two opposed wedges each adapted to cooperate with the adjacent ends to control the braking action of the friction device, and means for simultaneously moving said wedges in opposite directions in a plane transverse to the plane of the friction device to thereby move said adjacent ends in opposite directions to cause the friction device to cooperate with the drum, the forces produced by said wedges and which act on the ends of the friction device in the axial direction of said friction device being balanced.

5. In braking apparatus, a rotatable drum, a friction device adapted to cooperate with the drum and having adjacent ends, two aligned wedges each adapted to cooperate with the adjacent ends of the friction device, a floating fluid motor exterior of the drum and friction device and comprising two elements movable in opposite directions, and connecting means between the elements and the wedges whereby the wedges will be moved in opposite directions and with an equal pressure when the fluid is operated.

6. In braking apparatus, a rotatable drum, a friction device adapted to cooperate with the drum, two aligned wedges each cooperating with a portion of the friction device, two rods in telescoping relation, one of said rods being connected to one of the wedges and the other rod to the other wedge, and means for simultaneously moving said rods in opposite directions to thereby move the wedges in opposite directions to actuate the friction device.

7. In braking apparatus, a rotatable drum, a friction device adapted to cooperate with the drum, two aligned wedges each cooperating with a portion of the friction device, two rods in telescoping relation, one of said rods connected to one of the wedges and the other rod to the other wedge, and a fluid motor having elements movable in opposite directions and connected to the rods for operating the wedges to thereby actuate the friction device.

8. In braking apparatus, a rotatable drum, a friction device adapted to cooperate with a single zone of the drum and having adjacent ends, two aligned wedges each adapted to cooperate with the said adjacent ends, and means carried by the friction device and interposed between the wedges for moving said wedges in opposite directions to thereby move said adjacent ends of the friction device into engagement with the drum, the forces produced by said wedges and which act on the ends of the friction device in the axial direction of said friction device being balanced.

9. In braking apparatus, a rotatable drum, a friction device adapted to cooperate with the drum and having adjacent ends, two aligned wedges each adapted to cooperate with the said adjacent ends, a fluid motor comprising a piston and cylinder interposed between the wedges and carried by the friction device, a connection between the piston and one of said wedges, a connection between the cylinder and the other of said wedges, and means for supplying fluid under pressure to the cylinder to thereby move the cylinder and piston in opposite directions.

10. In braking apparatus, a rotatable drum, a friction device adapted to cooperate with the drum and having a free end, two aligned wedges cooperating with spaced portions of said free end, a piston connected to one wedge, a cylinder connected to the other wedge, said piston being reciprocable in the cylinder and both being interposed between the wedges, and means for supplying fluid under pressure to the cylinder to thereby move the cylinder and piston in opposite directions.

11. In braking apparatus, a rotatable drum, a friction device adapted to cooperate with the drum and having adjacent free ends, two grooved rollers carried by each free end, the rollers on one end being opposite the rollers on the adjacent end, two aligned wedges each of which cooperates with the groove of a roller on each end of the friction device, a cylinder secured to one wedge and slidably engaging the other wedge, a piston mounted in the cylinder and connected to said other wedge, and means for supplying fluid under pressure to the cylinder to thereby move the cylinder and piston in opposite directions.

BURNS DICK.